United States Patent
Oks et al.

(10) Patent No.: US 7,143,120 B2
(45) Date of Patent: Nov. 28, 2006

(54) SYSTEMS AND METHODS FOR AUTOMATED MAINTENANCE AND REPAIR OF DATABASE AND FILE SYSTEMS

(75) Inventors: Artem A. Oks, Bellevue, WA (US); Hanumantha Rao Kodavalla, Sammamish, WA (US); Martin J. Sleeman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 94 days.

(21) Appl. No.: 10/837,932

(22) Filed: May 3, 2004

(65) Prior Publication Data

US 2005/0278394 A1    Dec. 15, 2005

(51) Int. Cl.
G06F 17/30    (2006.01)
G06F 11/07    (2006.01)

(52) U.S. Cl. ............................ 707/202; 714/15; 714/21
(58) Field of Classification Search ............... 707/200, 707/201, 202, 203, 204; 714/15–20, 701, 714/21
See application file for complete search history.

(56) References Cited

U.S. PATENT DOCUMENTS

| | | | | |
|---|---|---|---|---|
| 4,945,474 A | * | 7/1990 | Elliott et al. | 707/202 |
| 5,806,074 A | | 9/1998 | Souder et al. | 707/21 |
| 5,900,870 A | | 5/1999 | Malone et al. | 345/333 |
| 6,047,291 A | | 4/2000 | Anderson et al. | 707/103 |
| 6,108,004 A | | 8/2000 | Medl | 345/346 |
| 6,112,024 A | | 8/2000 | Almond et al. | 395/703 |
| 6,199,195 B1 | | 3/2001 | Goodwin et al. | 717/1 |
| 6,240,414 B1 | | 5/2001 | Beizer et al. | 707/8 |
| 6,314,433 B1 | * | 11/2001 | Mills et al. | 707/202 |
| 6,338,056 B1 | | 1/2002 | Dessloch et al. | 707/2 |
| 6,370,541 B1 | | 4/2002 | Chou et al. | 707/103 |
| 6,519,597 B1 | | 2/2003 | Cheng et al. | 707/10 |
| 6,556,983 B1 | | 4/2003 | Altschuler et al. | 706/55 |
| 6,578,046 B1 | | 6/2003 | Chang et al. | 707/103 |
| 6,671,699 B1 | * | 12/2003 | Black et al. | 707/201 |
| 6,671,757 B1 | | 12/2003 | Multer et al. | 710/100 |
| 6,694,336 B1 | | 2/2004 | Multer et al. | 707/201 |
| 6,738,789 B1 | | 5/2004 | Multer et al. | 707/201 |
| 6,757,696 B1 | | 6/2004 | Multer et al. | 707/201 |
| 6,772,178 B1 | | 8/2004 | Mandal et al. | 707/204 |
| 6,871,271 B1 | * | 3/2005 | Ohran et al. | 707/204 |
| 2002/0091702 A1 | | 7/2002 | Mullins | 707/100 |
| 2002/0152422 A1 | | 10/2002 | Sharma et al. | 714/13 |
| 2002/0198891 A1 | | 12/2002 | Li et al. | 707/102 |
| 2004/0024795 A1 | | 2/2004 | Hind et al. | 707/204 |

OTHER PUBLICATIONS

Microsoft Press Computer Dictionary, 1997, Microsoft Press, third edition, pp. 39 and 40.*

Bullock et al., Recovering of Data Pages After Partial Page Writes, Aug. 1991, IBM Technical Disclosure Bulletin, vol. 34, No. 3, pp. 69-83.*

(Continued)

*Primary Examiner*—John Cottingham
*Assistant Examiner*—Kuen S. Lu
(74) *Attorney, Agent, or Firm*—Woodcock Washburn LLP

(57) ABSTRACT

The present invention relates generally to database and file system management and, more particularly, to automatic database and file system maintenance and repair to ensure data reliability. Various aspects of the present invention relate to responding and correcting data corruptions at a data page level for all data page types, as well as to recovery (including rebuild or restore operations) for various scenarios including, without limitation, index page corruptions (clustered and non-clustered), data page corruptions, and page corruptions in the log file.

27 Claims, 8 Drawing Sheets

OTHER PUBLICATIONS

Ponnekani et al. Online Index Rebuild, 2000, Proceedings of the 2000 AMC SIGMOD International Conference on Management of Data, pp. 529-538.*

Levy et al., Incremental Recovery in Main Memory Database System, 1992, IEEE Transactions on Knowledge and Data Engineering, vol. 4, No. 6, pp. 529-340.*

Andrews, T. et al., "Combining Language and Database Advances in an Object-Oriented Development Environment", *OOPSLA Proceedings*, Oct. 4-8, 1987, 430-440.

Beard, et al., "Multilevel and Graphical Views of Metadata", *Research and Technology Advances in Digital Libraries*, 1998, 256-265.

Beitner, N.D. et al., "Multimedia Support and Authoring in Microcosm: An Extended Model", *Department of Electronics and Computer Science*, University of Southampton, 12 pages.

Berg, C., How Do I Create Persistent Java Objects? *Dr. Dobb's Journal*, 1997, 22(4), 98-101.

Bhattacharya, S. et al., "Coordinating Backup/Recovery and Data Consistency Between Database and File Systems", *International Conference on Management of Data and Symposium on Principles of Database Systems, Proceedings of the 2002 ACM SIGMOD International Conference on Management of Data*, 2002, 500-511.

Biliris, A., "The Performance of Three Database Storage Structures for Managing Large Objects", *ACM SIGMOD*, 1992, 276-285.

Booch, G. Benjamin/Cummings Publishing Co, "Object-Oriented Analysis and Design with Applications", 1994, 155, 156, 179-183.

Bracchi et al., "Binary Logical Associations in Data Modelling", *Modelling in Data Base Management Systems G.M. Nijssen, (ed); North Holland Publishing Company:* 1976, 125-147.

Buneman, P. et al., Inheritance and Persistence in Database Programming Languages, *ACM*, 1986, 4-15.

Chien, A.A., "Concurrent Aggregates (CA)—Design and Experience with a Concurrent Object—Oriented Language Based on Aggregates", *J. Parallel and Distributed Computing*, 1995, 25(2), 174-196.

Chryssostomidis, Chryssosiomos, et al. "Geometric Modeling Issues in Computer Aided Design of Marine Structures", *MTS Journal*, 22(2) pp. 15-33.

"Computervision Launches Design Automation Development Platform for Windows", *PR Newswire*, Financial News, Jan. 10, 1995.

D'Andrea, A. et al., "Unisql's Next Generation Object-Relational Database Management System", *ACM SIGMOD Record*, Sep. 1996, 25(2), 70-76.

Darby, C., Object Serialization in Java 1.1. Making Objects Persistent, *WEB Techniques*, 1997, 2(9), 55, 58-59.

"Developer's Guide to Apple Data Detectors-For Version 1.0. 2",©Apple Computer, Inc., 1997, 1-34.

Dietrich, Walter C., Jr., et al., "TGMS: An Object-Oriented System for Programming Geometry", *Software-Practice and Experience*, Oct. 1989, 19(10), 979-1013.

Dobashi, Y. et al, "Skylight for Interior Lightning Design", *Computer Graphics Forum*, 1994, 13(3), C85-C96.

Dorsch, Jeff, "Accel Signs with IBM to Buy Altium PCB Unit-Accel Technologies Acquires the Assets to Altium's P-CAD Business Unit", *EDA Licensing, Electronic New*, Jan. 16, 1995, 4 pages.

Fegaras, Leonidas, "Optimizing Object Queries Using an Effective Calculus", *ACM Transactions on Database Systems*, Dec. 2000, 25(4), 457-516.

Findler, R.B. et al., Contract Soundness for Object-Oriented Languages ACM Conference on Object-Oriented Programming Systems, Languages, and Applications, *OOPSLA*, 2001, 15 pages.

Foley et al., Computer Graphics: Principles and Practices, Second Edition, Addison-Wesley Publishing Company, 1990, Ch. 5 and 9, pp. 201-283.

Friis, A.-Christensen, et al. "Geographic Data Modeling: Requirements and Research Issues in Geographic Data Modeling," Nov. 2001, *Proceedings of the 9th ACM International Symposium on Advances in Geographic Information Systems*, 2-8.

Fuh, Y-C. et al, "Implementation of SQL3 Structured Types with Inheritance and Value Substitutability", *Digital Symposium Collection*, 2000, Abstract only, 2 pages, www.acm.org/sigmod/disc/$p_{13}$implementationoyostw.htm.

Garret, J.H., Jr. et al, "An Object Oriented Environment for Representing Building Design and Construction Data", *Advanced Construction Technology Center*, Jun. 1989, Document No. 89-37-04, 1-34.

Godoy Simões, M. et al, "A RISC-Microcontroller Based Photovoltaic System for Illumination Applications", *APEC 2000. Fifteenth Annual IEEE Applied Power Electronics Conference and Exposition*, Feb. 6-10, 2000, 2, 1151-1156.

Goscinski, A. "Distributed Operating Systems The Logical Design", *Addison-Wesley*, 1991, 306-313.

Harrison, C.J. et al., "Structure Editors: User-Defined Type Values and Type Inference", *IEEE*, 2000, 241-247.

Haverlock, K., "Object Serialization, Java, and C++", *Dr. Dobb's Journal*, 1998, 23(8), 32, 34, 36-37.

Hay, David C, "Data Model Patterns: Conention of Thought", Dorset House Publishing, New York, NY 1996, 47-67, 235-259.

Hernandez, M.A. et al, "The Merge/Purge Problem for Large Databases, International Conference on Management of Data and Symposium on Principles of Database Systems", *Proceedings of the 1995 ACM SIGMOD International Conference on Management of Data*, 1995, 127-138.

Hsiao, H.I. et al., "DLFM: A Transactional Resource Manager", *SIGMOD, Proceedings of the 2000 ACM SIGMOD International Conference on Management of Data*, 2000, 518-528.

Kaneko, K, et al, "Design of 3D CG Data Model of Move Animation Database System", *Advanced Database Research and Development Series, vol. 3, Proceedings of the Second Far-East Workshop On Future Database Systems*, 1992, 364-372.

Kaneko, K. et al., Towards Dynamics Animation on Object-Oriented Animation Database System Move, *Advanced Database Research and Development Series*, vol. 4, Database Systems for Advanced Applications1993, 3-10.

Katz, R.H., "Toward a Unified Framework for Version Modeling in Engineering Databases", *ACM Computing Surveys*, 1990, 22(4), 375-408.

Kawabe, S. et al, "A Framework for 3D Modeling Constraint-Based Description and Non-Manifold Geometric Modeling", *A Collection of Contributions based on Lectures Presented at the 2d Toyota Conference, Organization of Engineering Knowledge for Product Modelling in Computer Integrated Manufacturing*, Japan, Oct. 2-5, 1988, 325-357.

Kempfer, L., "CAD Jumps on Windows 3.1 Bandwagon", *Computer Aided Engineering*, 1993, 24-25.

Khan, L. et al, A Performance Evaluation of Storing XML Data in Relational Database Management Systems, *WIDM*, 2001, 31-38.

Khoshafian, S. et al, "Object Identify", *OOPSLA'86*, 1986, 21, 406-416.

Kiesling, R., "ODBC in UNIX Environments", *Dr. Dobb's Journal*, Dec. 2002, 27(12), 16-22.

King et al, "TriStarp— An Investigation into the Implementation and Exploitation of Binary Relational Storage Structures", *Proc. 8.sup.th BNCOD(Bristish National Conference On Data Bases)*, pp. 64-84 (York 1990).

Krouse, J.K., "Geometric Models for CAD/CAM", *Machine Design*, Jul. 24, 1990, 99-105.

LeBlanc, Andrew R., et al, "Design Data Storage and Extraction Using Objects", *Concurrent Engineering: Research and Applications*, 1993, 1, 31-38.

Leontiev, Y. et al, "On Type Systems for Object-Oriented Database Programming Languages", *ACM Computing Surveys*, Dec. 2002, 34(4), 409-449.

Lim, J.B. et al, "Transaction Processing in Mobile, Heterogeneous Database Systems", *IEEE Trans. on Knowledge and Sata Engineering*, 2002,14(6), 1330-1346.

Mallet, S. et al., "Myrtle: A Set-Oriented Meta-Interpreter Driven by a Relational Trace for Deductive Databases Debugging", *Lecture Notes in Computer Science*, 1999, 1559, 328-330.

Mariani, J. A., Oggetto: "An Object Oriented database Layered on a Triple Store", *The Computer Journal* , 1992, 35(2),108-118.

McMahon, L.E, "SED-A Non-Interactive Text Editor", Bell Laboratories, Aug. 15, 1978, 10 pages.

"Mechanical Design Software (Buyers Guide)", *Computer-Aided Engineering*, Dec. 1993, 12(12), 32-36.

Melton, J. et al, "SQL and Management of External Data", *SIGMOD Record*, Mar. 2001, 30(1), 70-77.

Mitchell, W.J., "The Logic of Architecture", *Massachusetts Institute of Technology*, 1990, 139-143.

Navathe, S.B., "Evolution of Data Modeling for Databases," *Communications of the ACM*, Sep. 1992, 35(9), 112-123.

Nelson, M. et al, "Generic Support for Caching and Disconnected Operation", *4th Workshop on Workstation Operating Systems*, Oct. 1993, 61-65.

Nijssen, G.M. et al., "Conceptual Schema and Relational Database Design, A Fact Oriented Approach", *Department of Computer Science, University of Queensland, Prentice Hall*, 10-33, 42-43, 48-51, 156-170.

Oracle 9i SQL Reference, Release 2 (9.2), Mar. 2002, 13-89 to 13-90.

Orenstein, J, et al, "Query Processing in the Object Store Database System", *ACM SIGMOD International Conference on Management of Data*, Jun. 1992, 21(2),403-412.

Ottogalli, F.G. et al., "Visualisation of Distributed Applications for Performance Debugging", *Lecture Notes in Computer Science*, Jan. 2001, 2074, 831-840.

Pachet, et al, "A Combinatorial Approach to Content-Based Music selection", *Multimedia Computing and Systems*, Jun. 7, 1999, 457-462.

Papiani, M. et al, "A Distributed Scientific Data Archive Using the Web, XML and SQL/MED", *SIGMOD Record*, Sep. 1999, 28(3), 56-62.

Powell, M., "Object, References, identifiers, and Equality white Paper", (Jul. 2, 1993), *OMG TC Document 93.7.5*, 1-24.

Prosise, J., "2-D Drafting: Why Pay More?", *PC Magazine: The Independent Guide to IBM-Standard Personal Computing*, 1993, 12(4), 255-289.

Reiner, A. et al., "Benefits of X-based Three-Tier Client/Server Model with ESRI Applications", *Virtual Solutions*, 1995, 9 pages.

Read, III, B.C., "Developing the Next Generation Cockpit Display System", *IEEE Aerospace and Electronics Systems Magazine*, 1996, 11(10), 25-28.

Rouse, N.E., "CAD Pioneers are Still Trailblazing", *Machine Design*, Oct. 22, 1987, 59(25),117-122.

Roussopoulos, N. et al., "Using Semantic Networks for Data Base Management", *Proceedings of the 1st Supplemental VLDB Conference*, 1975, 144-172.

Santos, J.L.T. et al., "Computer Aided Mechanical Engineering Design Environment for Concurrent Design Process", *Proceedings of the 1993 ITEC Workshop on Concurrent Engineering*, May 4-6, 1993, Simulation in Concurrent Engineering, 71-83.

Seshadri, P., "Enhanced Abstract data Types in Object-Relational Databases", *The VLDB Journal, The International Journal on Very Large Databases*, 1998, 7, 130-140.

Simon, A.R., *Strategic Database Technology: Management for the Year 2000*, 1995, pp. 6-9, 14-17, 55-57, Morgan Kaufmann Publishers.

Sreenath, N., "A Hybrid Computation Environment for Multibody Simulation", *Mathematics and Computers in Simulation*, 1992, 121-140.

Singhal, A. et al., "DDB: An Object Design Data Manager for VLSI CAD", *Association for Computer Machinery*, 1993, 467-470.

Stevens, T., "Value in 3-D", *Industry Week*, Jan. 8, 1995, 45-46.

Stonebraker, M., "The Case for Partial Indexes", *SIGMOD Record*, 1989, 18(4), 4-9.

Strickland, T.M., "Intersection of Relational and object", *Proceedings of the AM/FM International Conference XVII*, Mar. 14-17, 1994, 69-75.

Sutherland, J. et al., "The Hybrid Object-Relational Architecture (HORA), An Integration of Object-Oriented and Relational Technology", *Applied Computing: States of the Art and Practice*, 1993, 326-333.

Suzuki, H. et al., "Geometric Modeling for Modeling Products", *Proceedings of the Third international Conference on Engineering Graphics and Descriptive Geometry*, Jul. 11-16, 1988, Vienna Austria, 2, 237-243.

Sreekanth, U. et al., "A Specification Environment for Configuring a Discrete-Part Manufacturing System Simulation Infrastructure", *International Conference on Systems, Man and Cybernetics*, Oct. 17-20, 1993, 1, 349-354.

Taylor, R.H. et al., "An Integrated Robot System Architecture", *Proceedings of the IEEE*, Jul. 1983, 71(7), 842-856.

Varlamis I. et al., "Bridging XML-Schema and Relational Databases. A System for generating and Manipulating Relational Databases using Valid XML Documents", *DocEng' Ol*, Nov. 9-10, 2001.

Wilcox, J., "Object Databases-Object Methods in Distributed Computing", *Dr. Dobbs Journal*, Nov. 1994, 19(13), 26-34.

Watanabe, S., "Knowledge Integration for Architectural Design", *Knowledge-Based Computer-Aided Architectural Design*, 1994, 123-146.

Waugh, A., "Specifying Metadata Standards for Metadata Tool Configuration", *Computer Networks and ISDN Systems*, 1998, 30, 23-32.

Wold, E. et al., "Content-Based Classification, Search, and Retrieval of Audio", *IEEE Multimedia, IEEE Computer Society*, 1996, 3, 27-36.

Yoshikawa, M. et al., "XRel: A Path-Based Approach to Storage and Retrieval of XML Documents Using Relational Databases", *ACM Transactional on Internet technology*, Aug. 2001, 1(1), 110-141.

Ramsey, N. et al., "An Algebraic Approach to File Synchronization", *Software Engineering Notes, Association for Computing Machinery*, Sep. 2001, 26(5), 175-185, XP002295139.

* cited by examiner

Database Attach Error Handling

| Error Number | Description |
|---|---|
| 824 | I/O error %1!s! detected by Windows File System during %2!s! of page %3!s! of dbid %4!s! at offset %5!s! in file '%6!s!'. |
| 823 | I/O error %1!s! detected by OS during %2!s! at offset %3!s! in file '%4!s!'. |
| 605 | Attempt to fetch logical page %1!s! in database. %2!s! belongs to allocation unit %3!s!:%4!s! not to %5!s!:%6!s!. |

FIG. 4B

Online Operation Error Handling

| Error Number | Description |
|---|---|
| 824 | I/O error %1!s! detected by Windows File System during %2!s! of page %3!s! of dbid %4!s! at offset %5!s! in file '%6!s!'. |
| 823 | I/O error %1!s! detected by OS during %2!s! at offset %3!s! in file '%4!s!'. |
| 605 | Attempt to fetch logical page %1!s! in database. %2!s! belongs to allocation unit %3!s!:%4!s! not to %5!s!:%6!s!. |
| 615 | Could not find database table ID %1!s!, name '%2!s!'. |

FIG. 5B

SYSTEMS AND METHODS FOR AUTOMATED MAINTENANCE AND REPAIR OF DATABASE AND FILE SYSTEMS

CROSS-REFERENCE

This application is related by subject matter to the inventions disclosed in the following commonly assigned applications, the contents of which are hereby incorporated into this present application in their entirety: U.S. patent application Ser. No. 10/647,058, filed on Aug. 21, 2003, entitled "SYSTEMS AND METHODS FOR REPRESENTING UNITS OF INFORMATION MANAGEABLE BY A HARDWARE/SOFTWARE INTERFACE SYSTEM BUT INDEPENDENT OF PHYSICAL REPRESENTATION"; U.S. patent application Ser. No. 10/646,941, filed on Aug. 21, 2003, entitled "SYSTEMS AND METHODS FOR SEPARATING UNITS OF INFORMATION MANAGEABLE BY A HARDWARE/SOFTWARE INTERFACE SYSTEM FROM THEIR PHYSICAL ORGANIZATION"; U.S. patent application Ser. No. 10/646,940, filed on Aug. 21, 2003, entitled "SYSTEMS AND METHODS FOR THE IMPLEMENTATION OF A BASE SCHEMA FOR ORGANIZING UNITS OF INFORMATION MANAGEABLE BY A HARDWARE/SOFTWARE INTERFACE SYSTEM"; U.S. patent application Ser. No. 10/646,632, filed on Aug. 21, 2003, entitled "SYSTEMS AND METHODS FOR THE IMPLEMENTATION OF A CORE SCHEMA FOR PROVIDING A TOP-LEVEL STRUCTURE FOR ORGANIZING UNITS OF INFORMATION MANAGEABLE BY A HARDWARE/SOFTWARE INTERFACE SYSTEM"; U.S. patent application Ser. No. 10/646,645, filed on Aug. 21, 2003, entitled "SYSTEMS AND METHOD FOR REPRESENTING RELATIONSHIPS BETWEEN UNITS OF INFORMATION MANAGEABLE BY A HARDWARE/SOFTWARE INTERFACE SYSTEM"; U.S. patent application Ser. No. 10/646,575, filed on Aug. 21, 2003, entitled "SYSTEMS AND METHODS FOR INTERFACING APPLICATION PROGRAMS WITH AN ITEM-BASED STORAGE PLATFORM"; U.S. patent application Ser. No. 10/646,646, filed on Aug. 21, 2003, entitled "STORAGE PLATFORM FOR ORGANIZING, SEARCHING, AND SHARING DATA"; U.S. patent application Ser. No. 10/646,580, filed on Aug. 21, 2003, entitled "SYSTEMS AND METHODS FOR DATA MODELING IN AN ITEM-BASED STORAGE PLATFORM."

TECHNICAL FIELD

The present invention relates generally to database and file system management and, more particularly, to automatic database and file system maintenance and repair to ensure data reliability. Various aspects of the present invention relate to responding and correcting data corruptions at a data page level for all data page types, as well as to recovery (including rebuild or restore operations) for various scenarios including, without limitation, index page corruptions (clustered and non-clustered), data page corruptions, and page corruptions in the log file.

BACKGROUND

While client database platforms (i.e., home and business desktop computers) use hardware of a quality that is much lower than on server platforms, even server-class hardware (controllers, drivers, disks, and so forth) can cause data corruption such that a read operation does not return what the application wrote to the data store. Of course, this is clearly a more prolific problem with client database platforms (as opposed to server database platforms) for various reasons including without limitation to the increased probability of a client machine been arbitrary powered off in the midst of a write operation due to an unexpected power outage, which in turn leads to torn pages and potential database corruptions. (It is more common for server database systems to utilize uninterruptible power supplies to mitigate problems from power outages.) Media decay is another source of database corruptions, where the physical storage media quite literally wears out over time. And yet another source of concern regarding reliability is the detection and recovery from corruptions caused by the software errors both inadvertent (e.g., bugs) as well as pernicious (e.g., viruses).

Traditionally maintenance and repair of a databases has fallen to database managers and the like having a well-developed skill set and deep knowledge of database systems, or at least to individuals who are familiar with and regularly use database systems—by and large persons relatively skilled with regard to database technologies. On the other hand, typical consumer and business end-users of operating systems and application programs rarely work with databases and are largely ill-equipped to deal with database maintenance and repair issues.

While the disparate level of skill between these two groups has been largely irrelevant in the past, a database-implemented file system for an operating systems—such as the operating system disclosed in related the U.S. patent applications identified earlier herein in the section entitled "Cross-References"—creates a scenario where these lesser-skilled end-users will be faced with database maintenance and repair issues they will largely be unable to resolve. Thus a business/consumer database-implemented operating system file system, or "database file system" (DBFS) for short, must be able to detect corruptions and recover its databases to a transactionally consistent state and, in the cases of unrecoverable data loss, the DBFS must then guarantee data consistency at the level atomic change units to said data are maintained (i.e., at the "item" level for an item-based DBFS). Moreover, for DBFSs running by default in a lazy commit mode, the durability of transactions committed just before an abnormal shutdown is not guaranteed and must be accounted for and corrected.

Moreover, while business/consumer end-user will greatly benefit from automating DBFS maintenance and recovery, database managers and those of greater database skills will also benefit from a technical solution for general database maintenance and repair. It is commonplace in the art for database administrators to utilize database tools (for example, the database tuning advisor provided with SQL Server 2000), but these tools do not directly address reliability but instead provide a means by which backups of the database are administered and manage—and not in a mostly-automated fashion, but instead requiring substantial database administrator involvement, particularly when database backups are not available or other repair issues arise. Thus an automated solution to address database reliability would also be beneficial for database administrators and other skilled database users. The present invention provides just such a solution.

SUMMARY

Various embodiments of the present invention are directed a data reliability system (DRS) for a DBFS wherein the DRS comprises a framework and a set of policies for performing database administration (DBA) tasks automatically and with little or no direct involvement by an end-user (and thus is essentially transparent to said end-user). For several embodiments, the DRS framework implements mechanisms for plugging error and event notifications, policies, and error/event handling algorithms into the DRS. More particularly, for these embodiments DRS is a background thread that is in charge of maintaining and repairing the DBFS in the background, and thus at the highest level the DRS guards and maintains the overall health of the DBFS.

For various embodiments of the present invention, the DRS comprises the following features: (1) responding and correcting data corruptions at a page level for all page types; and (2) attempting a second level of recovery (rebuild or restore) for: (a) index page corruptions (clustered and non-clustered); (b) data page corruptions; and (c) page corruptions in the log file.

Certain embodiments of the present invention further comprise specific functionality for the DRS, including but not limit to: (i) handling repair/restore data corruption cases; and (ii) (iii) improving the reliability and availability of the system; and (iv) keeping a DRS error/event history table for a skilled third party to troubleshoot database or storage engine problems if necessary.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 4B is a table illustrating the errors handled by the DRS during database attachment;

FIG. 5B is a table illustrating the errors handled by the DRS during online operations;

DETAILED DESCRIPTION

The subject matter is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

The above summary provides an overview of the features of the invention. A detailed description of one embodiment of the invention follows. For various embodiments described below, the features of the present invention are described as implemented in the MICROSOFT SQL SERVER database system (sometimes referred to herein simply as "SQL") alone or incorporated into the MICROSOFT WinFS file system for the next generation personal computer operating system (commonly referred to as "Windows Longhorn" or "Longhorn" for short), the latter being the primary subject matter of many of the patent applications cross-referenced earlier herein. As mentioned above, SQL SERVER incorporates the MICROSOFT .NET Common Language Runtime (CLR) to enable managed code to be written and executed to operate on the data store of a SQL SERVER database. While the embodiment described below operates in this context, it is understood that the present invention is by no means limited to implementation in the SQL SERVER product. Rather, the present invention can be implemented in any database system that supports the execution of object-oriented programming code to operate on a database store, such as object oriented database systems and relational database systems with object relational extensions. Accordingly, it is understood that the present invention is not limited to the particular embodiment described below, but is intended to cover all modifications that are within the spirit and scope of the invention as defined by the appended claims.

Computer Environment

Figure 1:
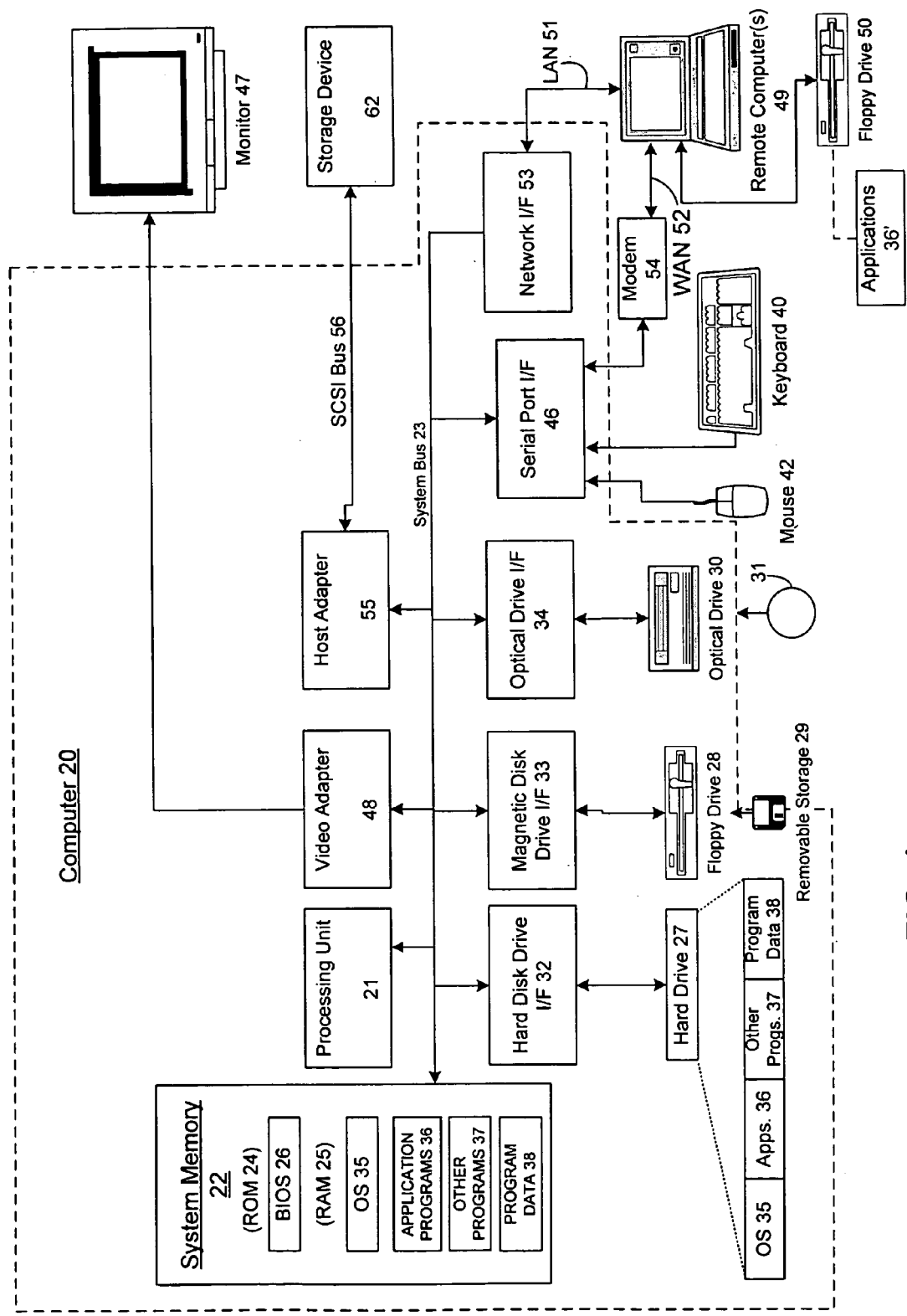
FIG. 1 is a block diagram representing a computer system in which aspects of the present invention may be incorporated.

Numerous embodiments of the present invention may execute on a computer. FIG. 1 and the following discussion is intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

While it is envisioned that numerous embodiments of the present invention are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

Overview of the Data Reliability System (DRS)

Figure 2:
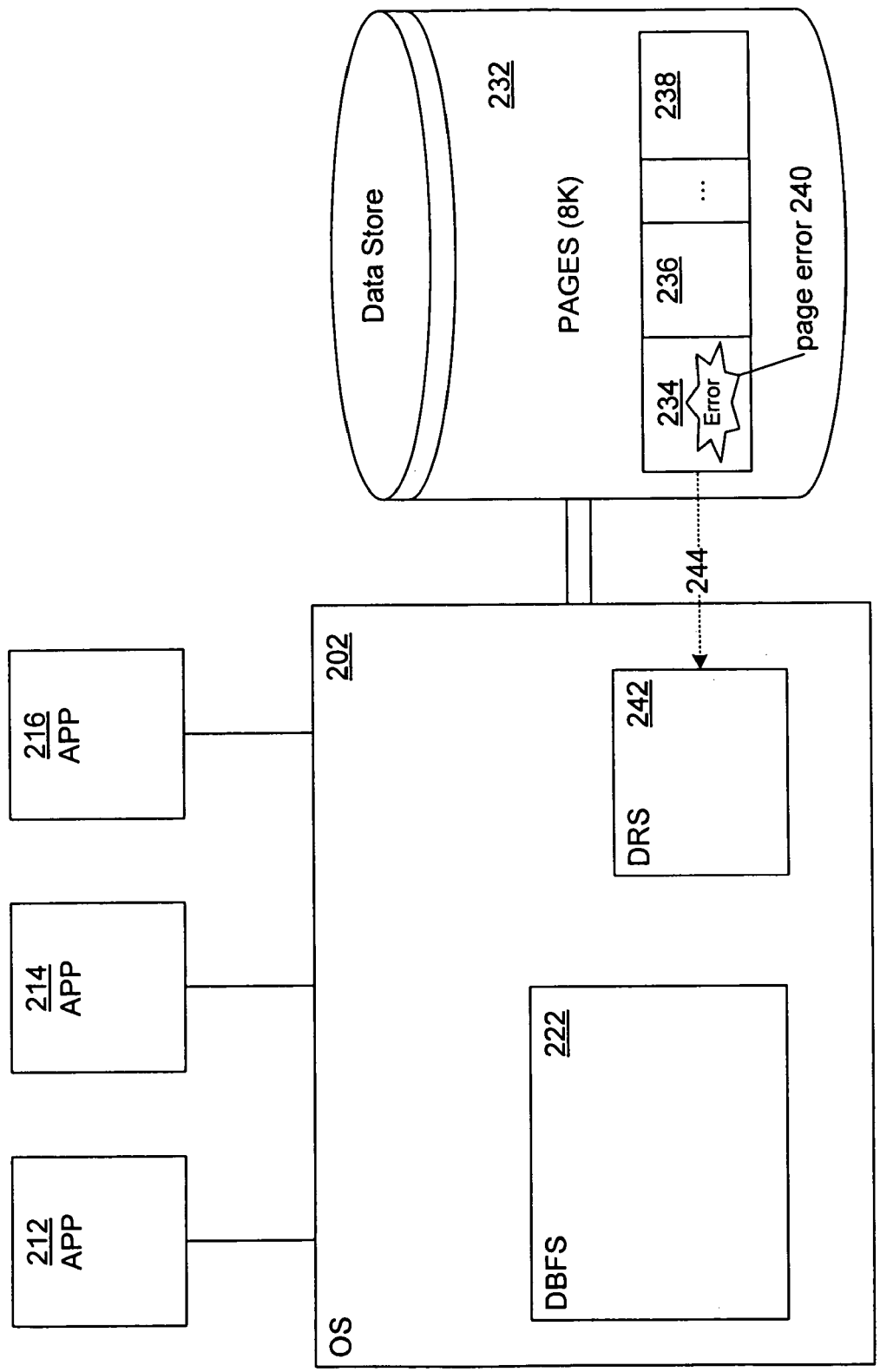
FIG. 2 is a block diagram illustrating the structure of the data reliability system (DRS) in database file system (DBFS) representative of several embodiments of the present invention.

For several embodiments of the present invention, the data reliability system (DRS) is a thread that maintains and repairs the database in the background, and thereby guards the general health of the database file system (DBFS). FIG. 2 is a block diagram illustrating the structure of the DRS in the DBFS. In the figure, an operating system 202 providing operating system level services to a plurality of applications 212, 214, and 216, comprises a DBFS 222 logically coupled to a persistent data store 232. The operating system 202 further comprises a DRS 242 which is invoked 244 by the DBFS 222 whenever a page error 240 from among a plurality of pages 234, 236, and 238 in the persistent data store 232 is discovered, and the DRS 242 then performs repair operations in response to the page error 240.

For various embodiments of the present invention, the DRS may comprise the following features: (1) responding and correcting data corruptions at a page level for all page types; and (2) attempting a second level of recovery (rebuild or restore) for: (a) index page corruptions (clustered and non-clustered); (b) data page corruptions; and (c) page corruptions in the log file. Certain embodiments of the present invention further comprise specific functionality for the DRS, including but not limit to: (i) handling repair/ restore data corruption cases; (ii) improving the reliability and availability of the system; and (iii) keeping a DRS error/event history table for a skilled third party to troubleshoot database or storage engine problems if necessary.

Certain embodiments of the present invention provide that the DRS be extensible so that recovery policies and detection mechanisms may be updated after a DBFS has been released. Several embodiments are direct to a DRS that run repairs while the DBFS database is kept online. Still other embodiments are directed to run with full access to the DBFS store (that is, sysadmin privileges). Still other embodiments will have the ability to detect and react to failures in real time. For several embodiments, DRS repairs will be transactional at the level change units to said data are maintained (i.e., at the "item" level for an item-based DBFS). Lastly, for various embodiments repairs will either completely recover an item or it will back out its changes, and the DRS will have the ability to continue the recovery/restoration work even if a reboot occurs half way thru the process.

For several embodiments of the present invention, the DRS will subscribe to SQL events so that if SQL fires a general event, the DRS may intercept it and react (including without limitation 823/824 events). In addition, another aspect of the present invention is for the database engine to be modified to send DRS-specific events for error conditions that the DRS is to specifically handle.

For various embodiments of the present invention, corruptions will be detected whenever the DBFS reads or writes pages from disk, in which case SQL will then generate one of a host of errors depending on what type of corruption it is and will also fire specific DRS events to notify it of the specific error conditions. DRS will receive those errors and place them on in an incoming queue for processing.

For several embodiments of the present invention, ascertaining whether a page is corrupted is accomplished by various means including, without limitation, (a) examining the checksum for a page and, if the checksum is invalid, the page is considered corrupt or (b) by examining the log serial number (LSN) to see if it is beyond the end of the log file (where an LSN is an integer that is incremented with each transaction so that if the last transaction in the log was LSN 432 and a page with a greater LSN is found then an out of order write error must have occurred. In this regard, there are four major types of page corruptions that can effect the operation of a DBFS (in addition to other sources such as bugs, etc.), and these four types include torn pages, media decay, hardware failure, and out-of-order writes. Torn pages occur when a page of data is not correctly written atomically, and thus any part of the page may be corrupted because during a write only some of the sectors of a page make it to disk before the failure event, for example, a power failure or a sector write failure. Media decay occurs when a data pages bits have been corrupted by physical media decay. A hardware failure could arise for a variety of reasons related to the bus, the controller, or the hard disk device. As for out-of-order write, these errors stem from the fact that IDE drives cannot guarantee the order of writes to the disk, especially the IDE drive has write-caching enabled (turned on), and thus it is possible that writes to the data store may occur out of order. If a partial series of out of order writes occur but are interrupted by a power failure, for example, then several errors may occur, such as the data page being written to disk before the associated log entry being written for example. While out-of-order errors can be detected by checking the log sequence numbers (LSN) on data pages, there is no easy way to do this short of reading every page.

Page Classes

For purposes of the present invention, all pages are classified according to one of the following classes of pages:
  Data pages: a data page is considered to be any page that has user data on it, which includes clustered index leaf pages.
  Index pages: these pages contain just index information, and they include both non-clustered index pages as well as non-leaf pages of a clustered index.
  System pages: these pages include the GAM, SGAM, and Boot pages, and the DRS may attempt page level restore on these pages even though DRS may have no specific restoration support for these pages; in any event, if page level restoration fails then the DRS attempts an emergency repair (discussed later herein).
  Unrecoverable pages: the PFS (Page Free Space) page or pages from the five system tables (Sysrowsetcolumns, Sysrowsets, Sysallocunits, Syshobtcolumns, Syshobts) comprise this class of pages, and DRS would restore the entire database in this case.
  Log Pages: these are pages that belong to the transaction log, and the DRS will attempt an emergency repair when they are corrupted (discussed later herein).

Corruption Categories

For several embodiments of the present invention, the DRS is designed to resolve three distinct categories of data page corruptions defined by when the corruption is detected, the three categories comprising: (1) during database attach; (2) during normal online operations; and (3) during transaction rollback.

Figure 3A:
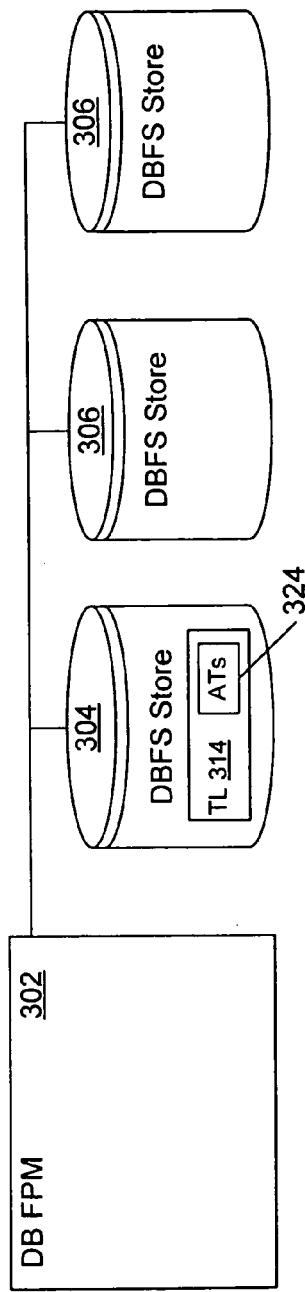
FIG. 3A is a block diagram illustrating the attachment of data stores by a database FPM to a DBFS.
Figure 3B:
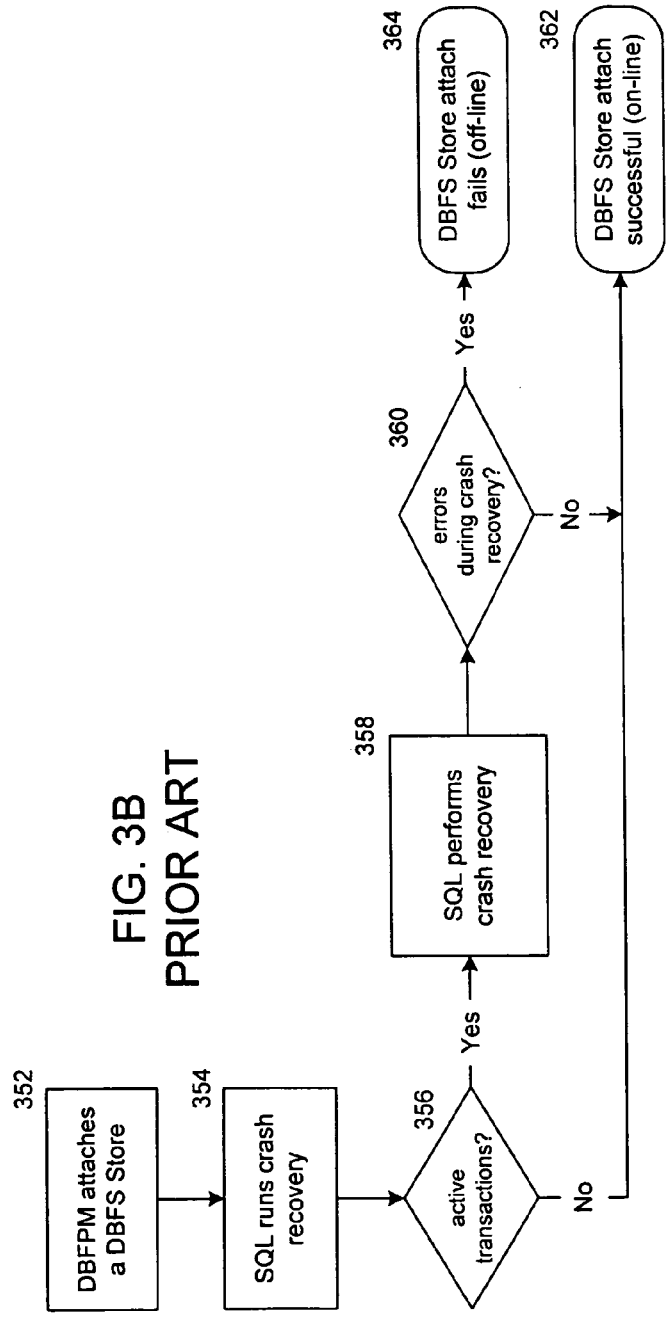
FIG. 3B is a flowchart illustrating the process by which corrupted pages are detected and corrected during a database attach operation for several embodiments of the present invention.

Database Attach Corruption Detection:

FIG. 3A is a block diagram illustrating the attachment of data stores by a database FPM to a DBFS. FIG. 3B is a flow chart illustrating the process by which corrupted pages are detected and corrected during a database attach operation. In general, a database file property manager (DBFPM) 302 manages the attaching and detaching of DBFS stores 304, 306, and 308. At step 352, when a DBFPM 302 attaches a store, e.g., DBFS store 304, SQL runs crash recovery at step 354 to determine at step 356 if there are any active transactions 324 at the time of the crash in the transaction log 314 (e.g. any incomplete transactions) and, if so, then SQL, at step 358, performs crash recovery of the database before continuing. During crash recovery SQL will normally (a) analyze the transaction log after the last checkpoint, (b) redo any operations in the log that it does not find written to disk, and (c) undo any transactions that have not completed. If there are no errors during recovery discovered at step 360, then the database is successfully attached at step 362. However, if an error is discovered at step 360 during crash recovery, SQL will fail the database attach at step 364.

This "database attach" scenario is important because it is invoked every time a store is attached. Stores are attached every time an operating system (e.g., the Window operating system) starts as well as every time external drives (e.g., Firewire, USB, etc.) are attached or detached from the computer. Database attach scenarios invoke crash recovery and thus the detection of torn pages (incomplete writes), and thus it is desirable for the DRS to handle this case because of the potential for a user to physically remove hardware.

Figure 4A:
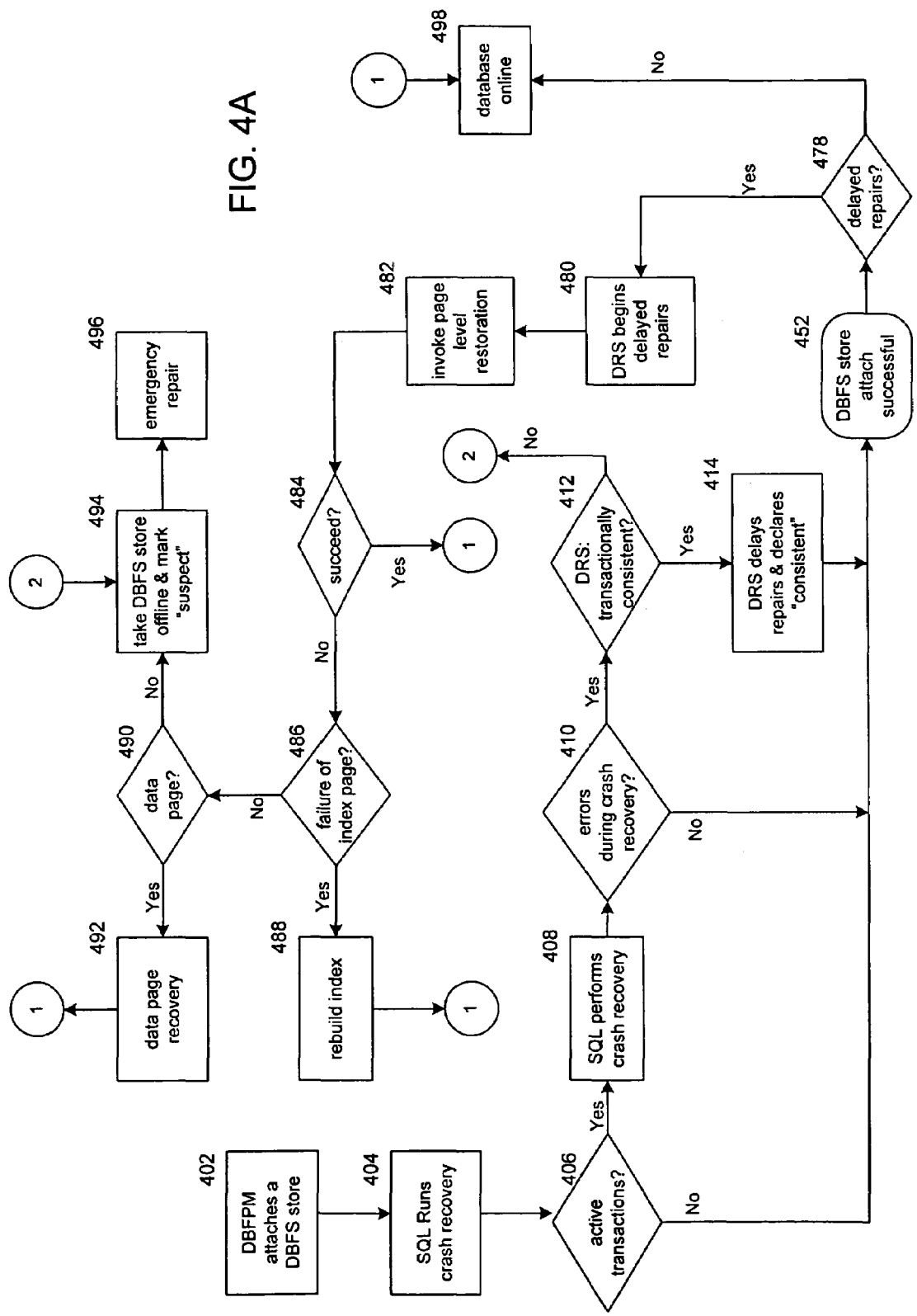
FIG. 4A is a flowchart illustrating the utilization of a DRS in a startup/crash-recovery context in accordance with various embodiments of the present invention.

However, when utilizing a DSR in accordance with various embodiments of the present invention, the behavior is slightly different as illustrated by the flowchart of FIG. 4A. First, at step 402, the DBFPM attaches the DBFS databases and, at step 404, SQL runs crash recovery and, at step 408, attempts to bring the database on line. If the database attaches without error from crash recovery at step 410, SQL will return success and the database will be attached (online) at step 452. However, if there are errors, the DRS, at step 412, will evaluate the database to determine if the database is transactionally consistent.

A database is inconsistent only if it has experienced a failure during a transaction rollback, that is, a physical or logical undo error—or if an unknown error occurred during crash recovery. If the database is transactionally consistent at step 412, the DRS, at step 414, will delay repairs until the recovery operation is complete—in other words, the DRS will declare the state of the database as consistent for the database attach (a "success") and then waits to begin repairs for the detected corruptions after the recovery is complete and the database is attached at step 452 in order to avoid any conflict with crash recovery.

Once the recovery is complete and the attach is successful at step 452, at step 478 if there were delayed repairs then, at step 480 DRS will begin the repairs and, at step 482, first attempt to invoke page level restoration for the corruption. If the page level restore fails or is not possible at step 484, then, at step 486, the DRS will ascertain whether it is due to a failure of an Index page and, if so, DRS will rebuild the index at step 488. On the other hand, if the error is in a data page at step 490, then DRS will attempt data page recovery at step 492. However, if the DRS determines that the database is inconsistent or has an unknown/unsupported error at step 490, the DRS will immediately take the database off line (thereby ending the recovery operation) and mark the database as "suspect" at step 494 and then, at step 496, attempt an emergency repair.

FIG. 4B is a table illustrating the errors handled by the DRS during database attachment.

Figure 5A:
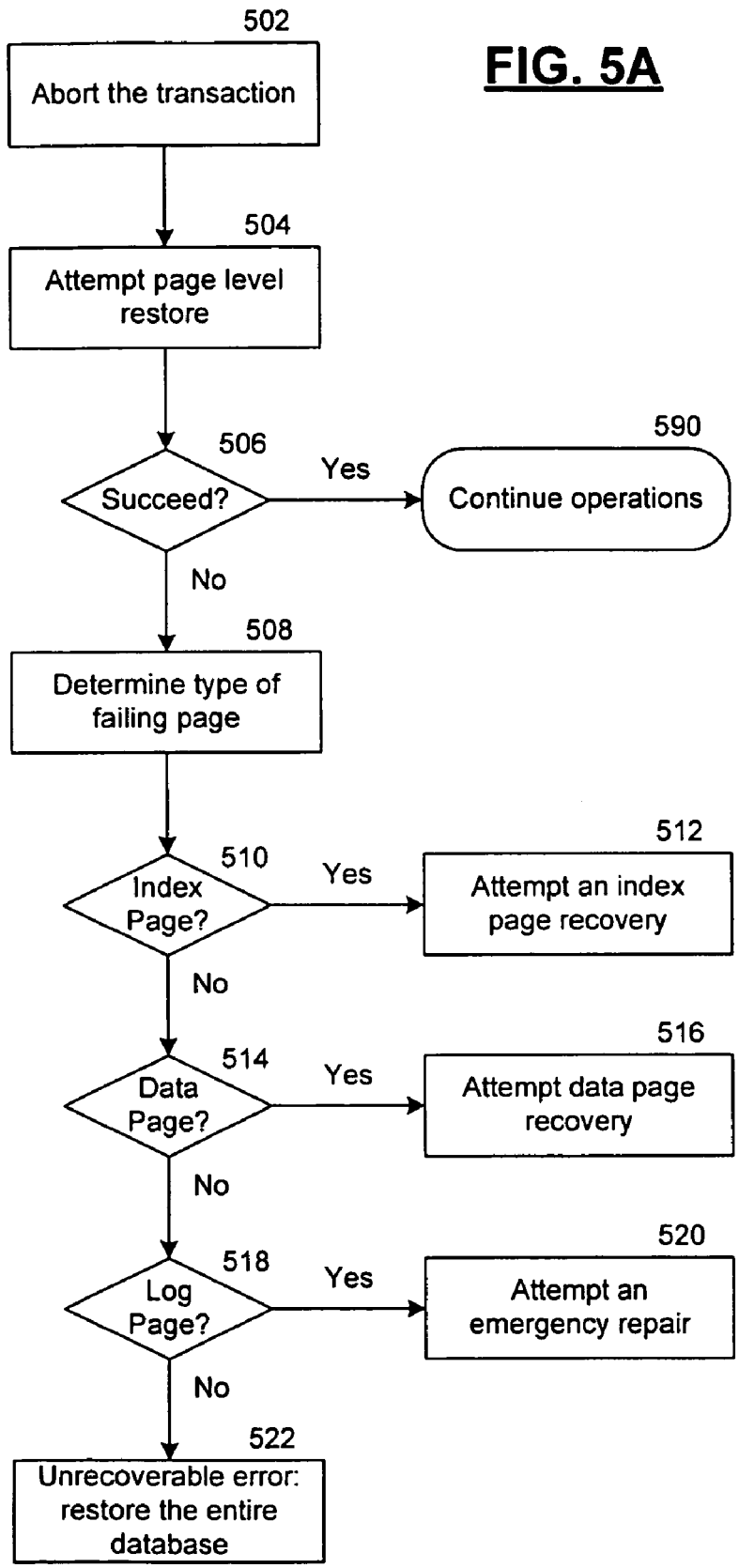
FIG. 5A is a flowchart illustrating the utilization of a DRS in a online operations where the query engine encounters an error for various embodiments of the present invention.

Online Operation Corruption Detection:

FIG. 5A is a flowchart illustrating the utilization of a DRS in a online operations where the query engine encounters an error for various embodiments of the present invention. This scenario is during normal run time use of the DBFS, such as when an end-user is using the operating system shell to execute a moderately complex query against the DBFS and, during the execution of that query, the query engine reports an error. In these online operation situations when an error occurs the DRS, at step 502, aborts the transaction to attempt to fix the error. The DRS, at step 504, will first attempt page level restoration. However, if the page level restoration is unavailable or fails at step 506, then DRS will determine the type of page is failing at step 508. At step 510, if it is a failure of an Index page, then DRS will attempt an index recovery at step 512. If the failure is a data page at step 514, then the DRS will attempt a data page recovery at step 516. If the failure is due to a system or log page error at step 518, the DRS will attempt an emergency repair at step 520. If the failure is an unrecoverable error (5 system tables, or PFS page) back at step 518, then the DFS will either automatically restore the entire database at step 522 or, alternatively, prompt the end-user to restore the entire database.

FIG. 5B is a table illustrating the errors handled by the DRS during online operations.

Transaction Rollback Corruption Detection:

If an error occurs during transaction rollback, the DRS will take the database off-line, mark it suspect, and restart the database in order to invoke crash recovery. The process will then re-invoke the method for crash recovery corruption detection disclosed earlier herein.

Recovery Techniques

As well-known and readily appreciated by those of skill in the art, transactional consistency pertains to displaying (or making available) only committed data, as well as committing (writing to the persistent store and logging the transaction) only correct data. In this regard, a database is transactionally consistent as long as all redo and undo requests during crash recovery are honored. Thus many types of corruption can be present in data and index pages but yet still be transactionally consistent.

Various embodiments of the present invention recognize that it is often undesireable to perform many of these transactions on-line and, therefore, these embodiments attempt to perform all repairs while the database is off-line.

When a SQL error occurs the DRS will only receive the page id and the database id. From that information, the DRS will interrogate the page to figure out exactly what type of page it is. These embodiments have a recovery mechanisms for data page and index corruption where the DRS attempts to recover the DBFS items lost due to that corruption. However there are many other types of pages that may be lost in the database including GAM, SGAM, PFS, Boot page, and others. While typical DBFSs do not have a specific backup and recovery mechanisms for these types of pages, the DRS will attempt to invoke page level restoration.

For a page has been corrupted, the DRS will attempt a page level restoration. Page level restoration will be silent because we can guarantee to the user that we will lose any data that has not been committed. The same technique will be applied to pages from any table, and the method does not change regardless of the type of page or table being restored. Page level restoration may only occur if the page exists in the most recent snapshot. Also a valid transaction log must be available. If the page is not in the most recent snapshot then we must recover the page using item level restore techniques known and appreciated by those of skill in the art (such as a restore from backup operation).

Figure 6:
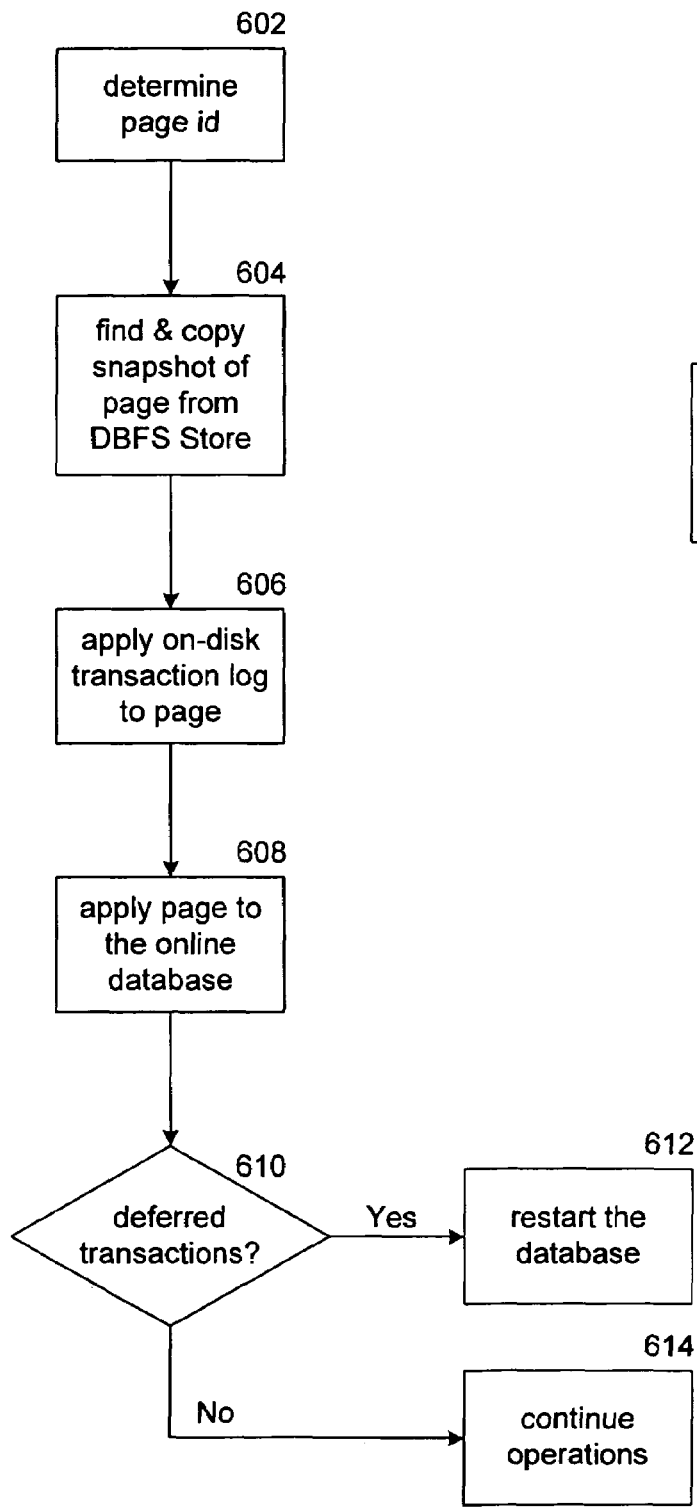
FIG. 6 is a flowchart illustrating the DRS performing a restore when a page does exist in a most recent snapshot and there is a valid transaction log.

If the page does exist in the most recent snapshot and there is a valid transaction log then the DRS will perform the following actions to restore the page, as illustrated by FIG. 6: (1) at step 602, determine the PageID of the page corrupted; (2) at step 604, find and copy the corrupted page from the most recent snapshot of DBFS store; (3) at step 606, apply the on-disk transaction log to the page by rolling forward the transactions that apply to that page; (4) at step 608, apply the restored page to the on-line database; and (5) if there are deferred transactions for the page being restored at step 610, then we will have to restart the database at step 612 (so that crash recovery is run and clears the deferred transactions), otherwise operations continue at step 614.

In regard to the aforementioned snapshot, VSS (Volume Shadowcopy Service) provides a way for maintaining point in time snapshots of certain volumes (e.g., NTFS volumes) as will be appreciated by those of skill in the art. The VSS snapshots maintain the shadow copy of a volume by using copy on write, that is, whenever a disk page is modified, the pre-image of that page is written to a snapshot storage area of the most recent snapshot. When TimeWarp is enabled on a machine—which may be the default for certain DBFSs and their corresponding operating systems—snapshots are taken at a default rate of twice a day and a maximum of 63 snapshots are maintained. To make use of pre-images stored in the snapshot, a log is maintained from the time the snapshot was taken to the current time, and log truncation happens only at TimeWarp snapshot time so that at all times there is a log from the last snapshot available. In case there is a page corruption and the page is available in the latest snapshot, the log can be re-played from the snapshot to the current point on that page to restore it.

During TimeWarp snapshots, the DBFS store on the snapshot is recovered. This makes page level restore impossible for pages that have been touched by recovery of the snapshot database. To get around this problem, a SQL Server viewpoint is taken on the database on the snapshot volume and then the database is recovered—that is, the DRS has an unrecovered viewpoint on the database in the snapshot volume and pages in that viewpoint can always be used for a page level restore.

For a system, log, or unknown page repair—that is, if a log corruption occurs or if there are failures that the DRS cannot correct (e.g. data or index), then DRS will present the user with the following options: (a) to restore the entire database (store); or (b) to recover the database in emergency mode.

Figure 7:
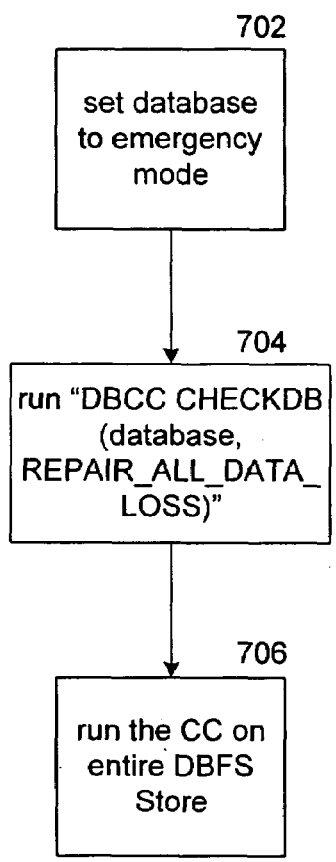
FIG. 7 is a flowchart illustrating the method for bringing a database back online for certain DRS embodiments of the present invention where the database cannot be recovered and there is no usable backup.

To repair the database in emergency mode, it is first important to recognize the new ability of DBCC to recover from a corrupt-transaction log and unrecoverable database situations. Then, if the database cannot be recovered and there is no usable backup, the following set of actions, illustrated in FIG. 7, will bring the database back online for certain DRS embodiments of the present invention: (a) at step 702, set the database to emergency mode; (b) at step 704, run 'DBCC CHECKDB (database, REPAIR_AL-LOW_ DATA_LOSS)' which has special meaning in emergency mode that (i) forces database recovery to proceed past errors (getting as much data as possible from the log but leaving a transactionally inconsistent database), (ii) throws away the corrupt log files and creates new ones, (iii) runs full database repair to bring the database to a structurally consistent state (an 'atomic', one-way operation that cannot be rolled-back or undone, and which is the only possible way of recovering the database in such a situation without manually editing files; and (c) now that the database is physically consistent, the DSR runs the CC on the entire store at step 706. The successful execution of these steps should guarantee that the data (the items in an item-based DBFS) will be consistent, but it may mean that certain applications will be transactionally inconsistent.

There are two types of index pages: non-clustered pages and clustered non-leaf pages. Index pages with data (clustered index leaf pages) are considered data pages. With this in mind, for recoverable indexes failures the DRS attempts to repair the index using offline index rebuild (where the database will be online during this repair, while just the index will be off line). If the repair fails the DRS drops the index and attempts to re-create the index. Then, if that also fails, the DRS will drop the index altogether or, alternately, disable the index and attempt to rebuild again at a later time (and perhaps doing so indefinitely until successful).

Figure 8:
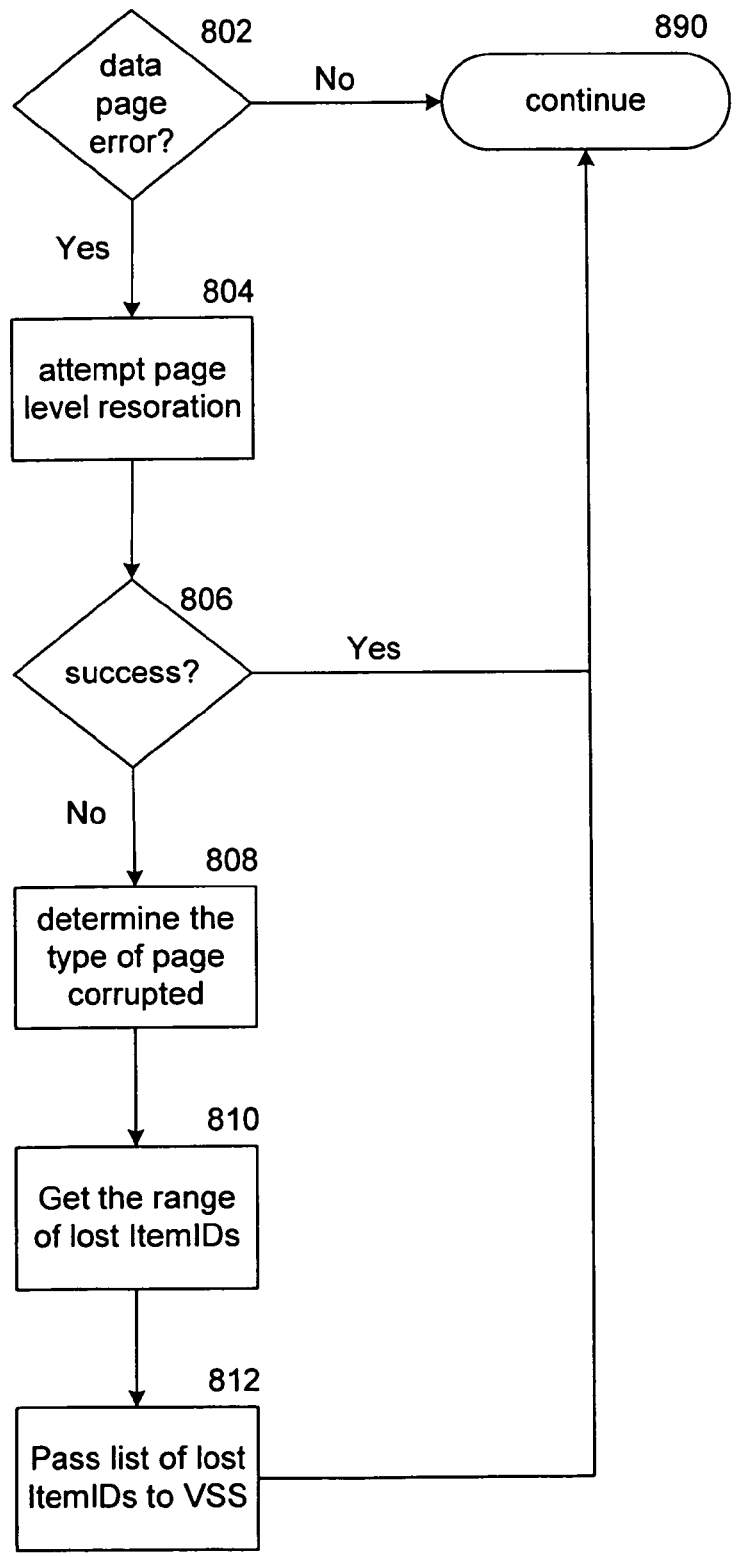
FIG. 8 is a flowchart illustrating the method for the DRS to attempt to recover a data page according to one aspect of the present invention.

For data page recovery, if the DRS receives one of the handled errors and determines that the page is a data page then it will attempt a recovery. This can occur during any state of SQL server operation (DB attach, online operation, and rollback). As illustrated in FIG. 8, if the DRS detects a data page error at step 802 then, after attempting a page level restoration at step 804 that fails at step 806, the DRS will: (a) at step 808 determine the type of page corrupted by receiving a PageID of the corrupted page and determining the type of page as previously discussed (and given a data page corruption, the DRS does not have to address other transactions attempting to access the page); (b) at step 810 get the range of lost ItemIDs (start a Tx, run DBCC CHECKTable (table, REPAIR_ALLOW_DATA_LOSS) which returns all index keys from non-clustered index that don't match the clustered keys, and the non clustered index keys, contain the ItemIds so the DRS can extract those and write those to an internal table; and (c) at step 812, pass the list of ItemIds & table names to WCC (where the WCC repairs those ItemIds (and checks the rest of the store) to ensure that DBFS is consistent, and commits Tx to allow the DRS to abort and retry these recoveries. If there is a set of corrupted pages, the DRS then figures out all the ItemIDs from all the corrupted pages before handing them off for further processing (such as by restoring said paged from a backup).

Since the DRS can guarantee that if page level restores works no user data will be lost, the DRS need only nominally inform the user since the user will most likely just notice a slower response than expected while page level restoration is occurring. In certain embodiments, the user will not receive any notification (since this will take seconds at most); however, for other alternative embodiments, the DRS will make an "event" log entry to capture the fact that the DRS restored a page. In the worst case scenario where there is an active transaction outstanding against the page to be restored, the database will have to be detached and restarted (so as to run crash recovery), and thus all the connections to the database will be terminated. Applications should already be designed with this possibility in mind; however this could cause badly designed applications to "hang." Thus certain embodiments of the present invention provide user notification of the circumstances that may lead to just such an event in order to allow the user to close all such applications in an effort to avoid this undesirable outcome.

Sample End-User Experiences

To illustrate the operation of the DRS, here follows a handful of situations that generally characterize the user experience as well as what the DRS is doing user-unseen:

Index Corruption:

Abbey is performing a WinFS query to find all the documents she's modified in the last week. During this query WinFS notices that it takes a little longer than usual. In fact some of her subsequent queries are also a little slow. She then notices a small balloon on her task bar. This balloon reports that a reliability issue has been found on her machine and please be patience while Windows repairs the errors. After a short while, another balloon appears and notifying Abbey that the index was successfully rebuilt. Abbey is pleased when she notices that her computer seems to perform better now.

Behind the scenes the DRS detected and repaired an index corruption. It took the index off-line (hence the slower performance), rebuilt it, and then put the index back on line.

Torn-Page Write:

During a lightning storm Toby is writing a essay on Adam Smith for a homework assignment and saving regularly. About 90% of the way through the essay Toby's entire home loses power. Toby isn't running on a laptop and doesn't have a battery backup. Luckily for Toby power comes on again in about 30 minutes. Toby logs on to the computer and attempts to open his essay. He scratches his head as it seems to take a little longer than usual.

Behind the scenes what has happened is that Toby's essay document item was corrupted because of a torn page write by his hard disk drive when the power was lost. When the DBFS restarted, the DRS detected this data page corruption and attempted a recovery of the data. The DRS automatically attempted to restore the data page from the automatic snapshot. Because Toby had been saving his work regularly there was a copy of the essay in the most recent snapshot. Therefore, the DBFS was able to restore the corrupted pages automatically.

Bit Rot and Sector Corruption:

Susan loves her digital camera so far she has taken over 5800 photo's of her children in the last 2 years. Of these 5800 she's kept over 3000 pictures in WinFS on her computer. Unfortunately for Susan her hard disk drive holding these precious photos has corrupted a small number of sectors on the disk. These corrupted sectors have now corrupted ten of Susan's pictures. When Susan attempts to view these pictures she gets an error from the operating system shell and is prompted to restore these pictures from backup. Susan follows the prompts, finds her backup media (a zip drive) and then restores the items from disk.

Behind the scenes the DBFS is attempting a page level restore. However because these pictures have not been modified (ever) they are not in the most recent snapshot, and thus prompting Susan to put in her backups (for just those items) is necessary for this particular embodiment.

CONCLUSION

The various system, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

What is claimed is:

1. An automated data reliability system (DRS) implemented at least in part by a computing device for a database file system (DBFS), said DRS comprising:
    a subsystem for performing database administration (DBA) tasks based on a set of policies;
    a subsystem for responding to a set of data corruptions at a page level;
    a subsystem for a first level of recovery for attempting to repair a corrupted page;
    a subsystem for a second level of recovery for attempting to rebuild or restore a corrupted page if said corrupted page cannot be repaired;
    a subsystem for evaluating a database associated with said DBFS to determine if the database is transactionally consistent; and
    a subsystem for delaying repairs if said database is transactionally consistent until a crash recovery is complete, otherwise proceeding with repairs without the delaying.

2. The system of claim 1 wherein said subsystem for a second level of recovery for rebuilding or restoring a corrupted page comprises a subsystem for addressing index page corruptions.

3. The system of claim 1 wherein said subsystem for a second level of recovery for rebuilding or restoring a corrupted page comprises a subsystem for addressing data page corruptions.

4. The system of claim 1 wherein said subsystem for a second level of recovery for rebuilding or restoring a corrupted page comprises a subsystem for addressing page corruptions in a log file.

5. The system of claim 1 further comprising an interface for adding, deleting, and modifying at least one functionality from among the following group of functionalities: error and event notifications, policies, and error/event handling algorithms.

6. The system of claim 1 wherein said DRS operates as a background thread.

7. A system for attaching and bringing online a data store for a database file system (DBFS), said system comprising:
    a subsystem for attaching said data store;
    a subsystem for running a crash recovery and attempting to bring the data store online,
        wherein a set of data corruptions occurs at a page level,
        wherein a first level of recovery attempts to repair a corrupted page and
        wherein a second level of recovery attempts to rebuild or restore a corrupted page if said corrupted page cannot be repaired;
    a subsystem for determining if the attempt to bring the data store online is not successful;
    a subsystem for evaluating a database associated with said data store to determine if the database is transactionally consistent;
    a subsystem for delaying repairs if said database is transactionally consistent until said crash recovery is complete, otherwise proceeding with repairs without the delaying.

8. The system of claim 7 further comprising a subsystem attempting a page level restoration and, if the page level restoration fails, ascertaining if the failure is due to an index page and, if so, rebuilding said index page when the attempt to bring the data store online is not successful and when the database is transactionally consistent.

9. The system of claim 7 further comprising a subsystem for taking the database offline and attempting an emergency repair when the attempt to bring the data store online is not successful and when said database is not transactionally consistent.

10. A method implemented at least in part by a computing device for automated data reliability system (DRS) for a database file system (DBFS), said method comprising:
    establishing a set of policies;
    performing database administration (DBA) tasks based on the set of policies;
    responding to a set of data corruptions at a page level for all page types;
    performing a first level of recovery by attempting to repair a corrupted page;
    performing a second level of recovery by attempting to rebuild or restore a corrupted page if said corrupted page cannot be repaired;
    evaluating a database associated with said DBFS to determine if the database is transactionally consistent; and
    delaying repairs if the database is tranactionally consistent until a crash recovery is complete, otherwise proceeding with repairs without the delaying.

11. The method of claim 10 wherein said subsystem for a second level of recovery for rebuilding or restoring a corrupted page comprises a subsystem for addressing index page corruptions.

12. The method of claim 10 wherein said subsystem for a second level of recovery for rebuilding or restoring a corrupted page comprises a subsystem for addressing data page corruptions.

13. The method of claim 10 wherein said subsystem for a second level of recovery for rebuilding or restoring a corrupted page comprises a subsystem for addressing page corruptions in a log file.

14. The method of claim 10 further comprising an interface for adding, deleting, and modifying at least one functionality from among the following group of functionalities: error and event notifications, policies, and error/event handling algorithms.

15. The method of claim 10 wherein said DRS operates as a background thread.

16. A method for attaching and bringing online a data store for a database file system (DBFS), said method comprising:
    attaching said data store;
    running a crash recovery and attempting to bring the data store online,
        wherein a set of data corruptions occurs at a page level,
        wherein a first level of recovery attempts to repair a corrupted page and
        wherein a second level of recovery attempts to rebuild or restore a corrupted corrupted page if said corrupted page cannot be repaired;
    determining if the attempt to bring the data store online is not successful;
    evaluating a database associated with said data store to determine if the database is transactionally consistent; and;
    delaying repairs if the database is transactionally consistent until said crash recovery is complete.

17. The method of claim 16, wherein the attempt to bring the data store online is not successful, and wherein the database is transactionally consistent, and wherein said repairs are delayed until said crash recovery is completed, said method further comprising attempting a page level restoration and, if the page level restoration fails, ascertaining if the failure is due to an index page and, if so, rebuilding said index page.

18. The method of claim 16, wherein the attempt to bring the data store online is not successful, and wherein said database is not transactionally consistent, said method further comprising taking the database offline and attempting an emergency repair.

19. A computer-readable storage medium having at least one tangible media, the tangible media comprising computer-readable instructions for automated data reliability system (DRS) for a database file system (DBFS), said computer-readable instructions comprising instructions for:
    performing database administration (DBA) tasks based on a set of policies;
    responding to a set of data corruptions at a page level for all page types;
    performing a first level of recovery by attempting to repair a corrupted page;
    performing a second level of recovery by attempting to rebuild or restore a corrupted page if said corrupted page cannot be repaired; and
    evaluating a database associated with said DBFS to determine if the database is transactionally consistent and, if transactionally consistent, delaying repairs until a crash recovery is complete, otherwise proceeding with repairs without the delaying.

20. The computer-readable instructions of claim 19 further comprising instructions whereby said subsystem for a second level of recovery for rebuilding or restoring a corrupted page comprises instructions for addressing index page corruptions.

21. The computer-readable instructions of claim 19 further comprising instructions whereby said subsystem for a second level of recovery for rebuilding or restoring a corrupted page comprises instructions for addressing data page corruptions.

22. The computer-readable instructions of claim 19 further comprising instructions whereby said subsystem for a second level of recovery for rebuilding or restoring a corrupted page comprises instructions for addressing page corruptions in a log file.

23. The computer-readable instructions of claim 19 further comprising instructions for an interface for adding, deleting, and modifying at least one functionality from among the following group of functionalities: error and event notifications, policies, and error/event handling algorithms.

24. The computer-readable instructions of claim 19 further comprising instructions whereby said DRS operates as a background thread.

25. A computer-readable storage medium having at least one tangible media, the tangible media comprising computer-readable instructions for attaching and bringing online a data store for a database file system (DBFS), said computer-readable instructions comprising instructions for:

attaching said data store;
running a crash recovery and attempting to bring the data store online,
  wherein a set of data corruptions occurs at a page level,
  wherein a first level of recovery attempts to repair a corrupted page and
  wherein a second level of recovery attempts to rebuild or restore a corrupted page if said corrupted page cannot be repaired;
determining if the attempt to bring the data store online is not successful;
evaluating a database associated with said data store to determine if the database is transactionally consistent; and
delaying repairs if the database is transactionally consistent until said crash recovery is complete.

26. The computer-readable instructions of claim 25 further comprising instructions for attempting a page level restoration and, if the page level restoration fails, ascertaining if the failure is due to an index page and, if so, rebuilding said index page when the attempt to bring the data store online is not successful and when the database is transactionally consistent and said repairs are delayed until said crash recovery is completed.

27. The computer-readable instructions of claim 25 further comprising instructions for taking the database offline and attempting an emergency repair when the attempt to bring the data store online is not successful and said database is not transactionally consistent.

* * * * *